July 8, 1952　　　J. B. BRENNAN　　　2,602,843
ELECTROLYTIC CELL
Filed April 6, 1949
Fig. 1.
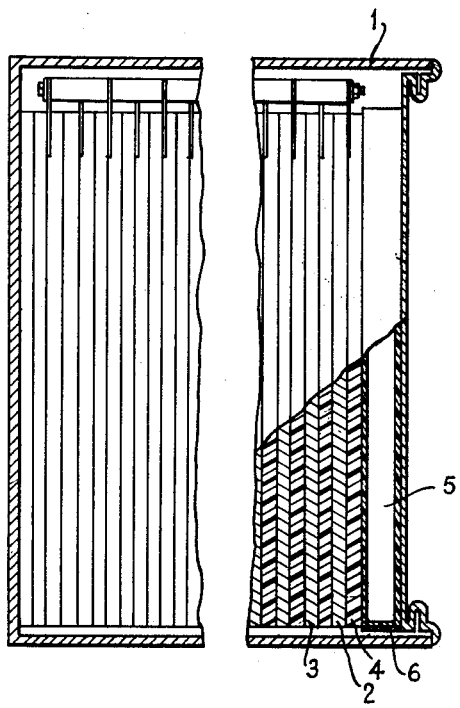
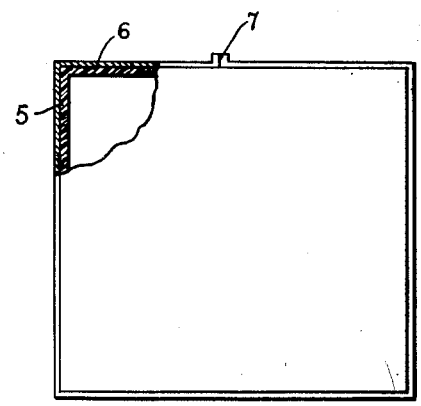
Fig. 2.
INVENTOR
JOSEPH B. BRENNAN
BY West & Oldham
ATTORNEYS Patented July 8, 1952

2,602,843

UNITED STATES PATENT OFFICE 2,602,843

ELECTROLYTIC CELL

Joseph B. Brennan, Cleveland, Ohio

Application April 6, 1949, Serial No. 85,876

11 Claims. (Cl. 175—315)

This is a continuation-in-part of my pending application U. S. Serial No. 40,919, filed July 27, 1948, and pertains particularly to the maintenance of uniform and substantial pressure on the electrode assembly in an electrolytic cell such as an accumulator or electrolytic condenser under all temperature conditions.

In the application aforesaid, lines 22, 23 and 24, page 3, I have described a means of maintaining such pressure by the use of an expansible diaphragm under varying temperature conditions.

According to this, my present, invention I find that it is possible to use a means such as a fluid containing sack to compensate for loss of pressure in the assembly of stacked plates due to lowering of temperatures.

This can be applied to either a porous electrode stack of any suitable metal and having corresponding active materials in the interstices thereof and having electrolytes either acid or alkaline therewith.

This can be accomplished either by clamping a fluid filled sack with the electrode and separator assembly between clamping plates as of polystyrene or metal with bolts and nuts of like material or by using the container as a clamping device.

According to this invention the flexible diaphragm-like wall of the cell can be eliminated if desired and made into a plain side wall having the fluid filled sack interposed between a side wall and the stacked assembly, the fluid in such sack being initially under a pressure such that it will exert pressure all over the exterior of one side of the stacked assembly, the fluid in such sack being of such a nature that it will expand with temperatures below the freezing point of the fluid in such sack.

Thus, for instance, water or a brine solution or water and antifreezing mixtures may be put into this sack under hydraulic pressure and when temperatures sufficiently low are reached this fluid will expand for example so as to form ice and will exert additional pressure on the stacked assembly so that the conductivity of the active material with which the porous plate assembly is impregnated and covered is increased.

This increase in pressure due to low temperatures on the stacked electrode and separator assembly enhances the conductivity of the active material and enables the charge to be accepted readily thereby and enables the charge to be readily given up thereby even under temperatures as low as —40° F.

In present battery construction no compensation of this nature is provided for of which I am aware.

In this improvement, according to this invention, in addition to the shrinkage of metal the diaphragm described in the above-mentioned application which would exert an increased pressure on the stacked assembly and in addition to the spring-like pressure illustrated in the said application, I am able to use the expansive force developed by ice formation.

In presently used battery constructions under extremely low temperature conditions the active materials which are generally metallic oxides or combinations thereof as well as the conductive plates have a shrinkage under extremely low temperatures causing great loss of useful capacity.

This must be compensated for very appreciably if the battery is to be useable in extreme cold.

At present an effort is made to maintain the batteries at an elevated temperature when used in extreme cold.

This means that heat sources must be used prior to utilizing the energy stored in the battery in order to keep the elements therein active and in order to keep the active material so that it will give up its charge.

According to this invention, the fluid sack can be made of any material which will expand and yet not push the electrolyte out of its casing through the vent.

It may be a somewhat flat metal sack or it may be made of suitable plastic or rubber-like materials which will withstand the conditions encountered in a cell in use.

In any case it should be so designed that it will exert facial pressure substantially over all of one facial surface of the stacked assembly when sufficient cold is encountered.

Referring to Fig. I of the drawings which accompany application Serial No. 40,919, such a flat sack filled with fluid expansible under low temperatures can be interposed preferably prior to introduction of electrolyte between the plate assembly 17 Fig. I and the diaphragmatic side wall 5 Fig. I or it can be interposed between the stacked assembly 17 Fig. I and the case 1 Fig. I according to this my present invention.

Where a sack is used to contain the low temperature expansible fluid it is preferable that a porous separator be interposed between the said fluid containing sack and the stacked assembly.

It is desirable in constructing the flexible expansible sack containing the low temperature expansible fluid so that edgewise the expansion is minimized or obviated and in order to accomplish this it is desirable that any areas not confined by the stacked assembly or the side wall of the container be retained by a metallic or a rigid confining means so that it will not expand edgewise to such an extent that it will force substantial change in the electrolyte level. It is also desirable to use a fluid which will not vaporize too readily.

Such a device can be used either with a plastic container or a metallic container or with a metallic container lined with a suitable rubber-like or plastic material.

A flat metallic sack or nickel plated steel equal in plane facial area to one facial area of the electrode and separator stack and under several hundred pounds per square inch hydraulic internal pressure and filled with water is a suitable device for use according to this invention.

In such a device two flat pieces of metal or hollow pieces are sealed at their edges by welding or interlocking or otherwise and may have a sealable fluid entrance means on top thereof which permits water or other fluid filling after assembly under hydraulic pressure.

Another advantage of the expansible fluid sack is that because it is initially installed under great facial pressure and serves to permanently compress the stack or retain it in compressed condition it permits the stack to expand and contract with somewhat great pressure interfacially so that the active material is conductive throughout and forced against and into the interstices and porous face of the metallic electrode under conditions of charge and discharge.

When used with a metallic expansible pressure exerting bellows as illustrated in application Serial No. 40,919 it is very effective or if used with a plain welled container it is also effective.

The clamping action of the metal case is increased due to shrinkage with the cold and assists in overcoming the shrinkage of the electrode assembly due to cold.

Separators such as are made of porous plastic polystyrene particles stuck together with toluol or other solvent adhesive may be used or interiorally hollow vertical tubing whereby the tubes are parallel and vertical and adjacently aligned and joined by toluol cement and having perforations or slits therein may be used as separators to permit free gassing of the stack.

As an alternate electrode spacer an extruded piece of polystyrene or equal having hollow tubular openings extending parallel to each other and vertical with reference to the cell and perforated or slotted exteriorly and interiorly may be used.

It is possible to apply the principle of this invention by use of an annular fluid filled sack surrounding a helically wound electrode and separator assembly the said sack being wrapped around the electrolytic electrode and separator assembly and inserted within the annular container.

A relatively flat stainless steel sack to exert pressure on freezing may be used with an acid cell having porous lead plates and active material therein and facially thereon.

In any case the electrodes for use according to this invention have active materials in the interstitial spaces between their particles and a layer on the faces thereof so that pressure is exerted facially by the paste-like active material on and into the pores of the porous electrodes causing the gradual extrusion of the pastelike active material into the tiny opening of the electrodes which openings extend in all directions.

Separators made of filter glass cloth or batting or webbing in two exterior layers and having porous particle layers of polystyrene or nylon therebetween serve as good separators for acid cells and separators having two exterior layers of long fiber unfilled asbestos paper with polystyrene particle layers therebetween serve as good separators for alkaline cells.

Such separators act as good breathing devices for gassing and yet are sufficiently rigid to support the pressure applied to the assembled electrode stack and also prevent migration of active material.

It is essential that the fluid filling the sack according to this invention be of such a nature that it will expand with cold prior to the cold effect reaching the electrolyte and electrodes to such an extent as to make the electrode assembly unuseable.

Fig. 1 is a vertical section, partially broken away, with a portion of the electrode being shown in elevation and a portion being shown in section, of an electrolytic cell embodying the principles of the invention; and Fig. 2 is an elevation, partially broken away and shown in section, of the expansible sack of the invention;

In Fig. 1 of the drawings there is shown a container 1 which positions the members forming the electrolytic cell of the invention and which includes alternate positive plates 2 and negative plates 3 which have dielectric separators 4 of conventional construction positioned therebetween. Usually the plates 2 and 3 are flat and are in aligned or stacked positions with relation to each other. At one end of a plurality of the stacked electrode plates of the invention, a flexible sack 5 is provided. This sack is usually formed of a relatively flat shape or contour and has two relatively flat, substantially parallel faces either of which is adapted to be abutted against one face of an adjacent electrode or separator plate. This sack 5 has an inflexible or rigid band, usually formed from metal, which extends around the periphery of the sack 5 but leaves the two flat surfaces thereof exposed. Usually this metal band 6 has end portions that are secured together by welding, as indicated at 7, or in other conventional manner. Thus the sack 5 can be confined so that it can only expand in a direction substantially normal to the flat surfaces of the associated electrodes and dielectric separators used in the electrolytic cell of the invention.

Having described my invention what I claim is:

1. In an electrolytic cell, a plurality of substantially flat surfaced electrodes, a plurality of separators positioned intermediate said electrodes, a flexible sack receiving a fluid therein, a container in which said electrodes, separators and sack are snugly positioned, and strap means around the periphery of said sack to prevent it from expanding in any direction except substantially normal to the surfaces of said electrodes.

2. In an electrolytic cell, a plurality of substantially flat surfaced stacked electrodes, a plurality of separators individually positioned intermediate said electrodes, a flexible sack which is full of liquid including water, a container in which said electrodes, separators and sack are positioned under pressure extending substantially normally to the flat surface of said electrodes, and a strap means around the edge periphery of said sack to prevent it from expanding in any direction except substantially normal to the flat surfaces of said electrodes.

3. In an electrolytic cell, a pair of substantially flat surfaced electrodes, a separator positioned intermediate said electrodes, a flexible liquid containing sack, a container in which said electrodes, separator and sack are positioned under pressure, and confining means around a portion of said sack to prevent it from expanding in any direction except substantially normal to the surfaces of said electrodes.

4. In an electrolytic cell, a pair of substantially flat surfaced flat electrodes, a separator positioned intermediate said electrodes, an expandible water containing sack having a flat surface of substantially the same size as said electrodes and being positioned parallel thereto, and a container in which said electrodes separator and sack are positioned, said sack being under pressure and compressing said electrodes in said container under non-freezing temperatures in a direction extending substantially normally to said flat electrodes.

5. In an electrolytic cell, a pair of substantially flat surfaced electrodes, a separator positioned intermediate said electrodes, an expandible liquid containing sack having a flat surface of substantially the same size as said electrodes and being positioned parallel thereto, and a container in which said electrodes, separator and sack are positioned, said sack being under pressure and compressing said electrodes in said container under non-freezing temperatures, said sack expanding under freezing temperatures.

6. In an electrolytic cell, a pair of electrodes having facial surfaces, and an expandible sack in pressure contact with the facial surfaces of said electrodes, a liquid which expands when frozen in said sack, and means for maintaining said electrodes and liquid-containing sack in assembled pressure contacting relation.

7. In an electrolytic cell, a pair of electrodes having face portions, an expandible sack in pressure contact with face portions of said electrodes, a container in which said electrodes and sack are positioned under pressure, and liquid means in said sack and freezing under temperatures lower than 32° F., said liquid means expanding when frozen.

8. In an electrolytic cell, a pair of electrodes having face portions, an expandible sack in pressure contact with face portions of said electrodes, liquid means in said sack and freezing under temperatures lower than 32° F., said liquid means expanding when frozen, and means for positioning said sack in pressure contact with a face portion of said electrodes and for directing expansion of said sack when said liquid is frozen toward said face portions of said electrodes.

9. In an electrolytic cell, a pair of electrodes having face portions, an expandible sack in pressure contact with face portions of said electrodes, liquid means in said sack and freezing under temperatures lower than 32° F., said liquid means expanding when frozen, and means for positioning said sack in pressure contact with a face portion of said electrodes.

10. An electrolytic cell comprising a plate and separator assembly, a sack filled with a liquid expansible at low temperatures, and means embracing said assembly and liquid-filled sack and maintaining the same under pressure.

11. An electrolytic cell comprising a stack of electrodes having face portions, and a low temperature expanding liquid-filled flexible container positioned in face to face relationship with said stack of electrodes, and means clamping the stack and container together to transmute expansion effects of the liquid into compressive effects on the stack.

JOSEPH B. BRENNAN.

REFERENCES CITED

The following references are of record in the file of this patent:

UNITED STATES PATENTS

| Number | Name | Date |
| --- | --- | --- |
| 655,883 | Middleby | Aug. 14, 1900 |

FOREIGN PATENTS

| Number | Country | Date |
| --- | --- | --- |
| 11,252 | Great Britain | of 1887 |
| 531,774 | Great Britain | Jan. 10, 1941 |